United States Patent
Yasuda et al.

(10) Patent No.: US 10,246,587 B2
(45) Date of Patent: Apr. 2, 2019

(54) TRANSPARENT POLYAMIDE-BASED COMPOSITION COMPRISING GLASS AS FILLER

(71) Applicant: ARKEMA FRANCE, Colombes (FR)

(72) Inventors: Maho Yasuda, Takamatsu (JP); Benjamin Saillard, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/123,420

(22) PCT Filed: Feb. 27, 2015

(86) PCT No.: PCT/FR2015/050475
§ 371 (c)(1),
(2) Date: Sep. 2, 2016

(87) PCT Pub. No.: WO2015/132510
PCT Pub. Date: Sep. 11, 2015

(65) Prior Publication Data
US 2016/0369098 A1   Dec. 22, 2016

(30) Foreign Application Priority Data
Mar. 4, 2014 (FR) ..................... 14 51755

(51) Int. Cl.
| C08L 77/00 | (2006.01) |
| C08L 77/06 | (2006.01) |
| C08K 7/14 | (2006.01) |
| C08G 69/36 | (2006.01) |
| C08G 69/40 | (2006.01) |
| C08L 77/02 | (2006.01) |

(52) U.S. Cl.
CPC .............. *C08L 77/06* (2013.01); *C08G 69/36* (2013.01); *C08G 69/40* (2013.01); *C08K 7/14* (2013.01); *C08L 77/02* (2013.01); *C08L 2201/10* (2013.01); *C08L 2205/02* (2013.01); *C08L 2205/03* (2013.01)

(58) Field of Classification Search
None
See application file for complete search history.

(56) References Cited

U.S. PATENT DOCUMENTS

| 4,404,317 | A | 9/1983 | Epstein et al. |
| 2002/0173596 | A1 | 11/2002 | Montanari et al. |
| 2006/0030692 | A1 | 2/2006 | Montanari et al. |
| 2008/0167415 | A1 | 7/2008 | Stoeppelmann et al. |
| 2010/0028640 | A1 | 2/2010 | Isozaki et al. |
| 2010/0076155 | A1 | 3/2010 | Higashiyama et al. |
| 2010/0160008 | A1 | 6/2010 | Topoulos |
| 2010/0249292 | A1 | 9/2010 | Saga et al. |
| 2011/0171408 | A1 | 7/2011 | Saillard et al. |
| 2013/0022786 | A1 | 1/2013 | Topoulos |
| 2014/0066560 | A1* | 3/2014 | Stoppelmann ........... C08K 7/14 524/407 |
| 2014/0179849 | A1* | 6/2014 | Aepli ..................... C08G 69/14 524/420 |

FOREIGN PATENT DOCUMENTS

| EP | 0070001 A1 | 1/1983 |
| EP | 0 628 602 A1 | 12/1994 |
| EP | 1 227 131 A1 | 7/2002 |
| EP | 1 595 907 A1 | 11/2005 |
| EP | 1 942 147 A1 | 7/2008 |
| EP | 2 169 008 A1 | 3/2010 |
| JP | S5817155 A | 2/1983 |
| JP | 2004-269727 A | 9/2004 |
| JP | 2008-280483 A | 11/2008 |
| JP | 2011-001560 A | 1/2011 |
| WO | 2007/055968 A2 | 5/2007 |
| WO | 2008/047672 A1 | 4/2008 |
| WO | WO 2009/153531 A1 | 12/2009 |
| WO | WO 2009/153534 A1 | 12/2009 |

OTHER PUBLICATIONS

International Search Report (PCT/ISA/210) dated May 22, 2015, by the European Patent Office as the International Searching Authority for International Application No. PCT/FR2015/050475.
Written Opinion (PCT/ISA/237) dated May 22, 2015, by the European Patent Office as the International Searching Authority for International Application No. PCT/FR2015/050475.
Office Action (Notification of Reasons for Refusal) dated Mar. 27, 2018, by the Japanese Patent Office in corresponding Japanese Patent Application No. 2016-555506, and an English Translation of the Office Action. (8 pages).

* cited by examiner

*Primary Examiner* — Ana L. Woodward
(74) *Attorney, Agent, or Firm* — Buchanan Ingersoll & Rooney P.C.

(57) ABSTRACT

The use of at least one semi-crystalline polyamide in a glass-charged amorphous polyamide resin for producing a composition which is more transparent than the resin. Polyamide-based transparent composition manufactured according to the use of the semi-crystalline polyamide, including: from 5.0 to 40.0% by weight of semicrystalline polyamide, from 20.0 to 80.0% by weight of at least one amorphous, transparent and at least partially cycloaliphatic polyamide, from 5.0 to 40.0%, preferably from 5.0 to 30.0%, by weight of glass filler, and optionally: from 0.0 to 5.0% by weight of PEBA, from 0.0 to 5.0% by weight of additives, with respect to the total weight of the composition.

31 Claims, No Drawings

TRANSPARENT POLYAMIDE-BASED COMPOSITION COMPRISING GLASS AS FILLER

The invention relates to the use of novel thermoplastic polymer compositions used for the manufacture of articles exhibiting excellent properties of transparency, in particular a high transmittance, in combination with a low haze.

A subject-matter of the invention is more particularly the manufacture of transparent equipment used in automobile parts, lighting or optical devices, electrical, electronic and telecommunication appliances and in particular mobile telephony.

The term "excellent properties of transparency" should be understood as meaning, within the meaning of the invention, the materials exhibiting:
- a transmittance at least equal to 75%, in particular 85% at 560 nm on a sheet with a thickness of 2 mm (measured according to Standard ISO 13468-2:2006),
- a haze of less than 15% (haze unit), measured according to Standard ASTM D1003-97. The term "haze" should be understood as meaning a tarnishing of a surface, a fogging, fog, "mist", or condensation effect at the surface of the material. This effect can detrimentally affect the transparency, the aesthetic appearance and the shininess of the surface of the article.

Transparent materials formed from amorphous PA are used for the manufacture of transparent optical devices. They have the advantage of being light but their stiffness has to be improved by the addition of a reinforcing material, such as reinforcing fibres, in particular glass fibres, inorganic fillers or rubber components.

The patent document EP 2 169 008 describes an amorphous polyamide (PA) resin composition comprising a glass filler, the difference in refractive indices between the glass filler and polyamide not exceeding 0.002. This composition makes it possible to obtain a moulded article (sheet with a thickness of 2 mm) exhibiting a transmittance of approximately 65% and haze of approximately 25% but these performances prove to be insufficient for the achievement of an excellent transparency as in the case of the present invention.

In addition, the high glass transition temperature (Tg), of greater than 150° C., of these reinforced transparent PAs can render the conversion (in particular the injection moulding) of these materials more difficult, sometimes with problems of material shrinkage.

Document U.S. Pat. No. 4,404,317 describes particular moulding mixtures comprising a semicrystalline polyamide, an amorphous polyamide and glass fibres. This document is silent with regard to the transmittance properties of these mixtures.

A search is thus under way today for materials which are more transparent (with the highest possible transmittance and the lowest possible haze), more rigid and easy to process with the existing processes or devices for shaping polymers.

Another aim of the present invention is to provide a process for the manufacture of such articles which is simple, easy to carry out and fast (which exhibits the fewest possible stages) and which avoids the problems of shrinkage, in particular after injection moulding.

A means for obtaining an article combining all these properties has now been found by the use of at least one semicrystalline polyamide in an amorphous polyamide resin comprising glass as filler.

DETAILED DESCRIPTION OF THE INVENTION

In the present description, it is specified that:
- the limits are excluded when "between" two limits is written, and
- the limits are included when "the range from X to Z" or "representing X to Y %" is written.

A subject-matter of the present invention is thus the use of at least one semicrystalline polyamide in a glass-filled amorphous polyamide resin for the manufacture of a composition more transparent than the said resin.

The transparency of the glass-filled amorphous polyamide resin additionally comprising a semicrystalline polyamide according to the invention, as determined by the measurement of the transmittance according to standard ISO 13468-2:2006, is therefore greater than the transparency of solely the said glass-filled amorphous polyamide resin as determined by the measurement of the transmittance according to standard ISO 13468-2:2006.

The subject-matter of the present invention is in particular a polyamide-based composition comprising:
- semicrystalline polyamide,
- amorphous polyamide, and
- a glass filler.

The term "semicrystalline polyamides" is understood to mean, within the meaning of the invention, generally linear aliphatic polyamides, the crystallinity of which is reflected by the presence of spherolites having a size which is sufficiently great for the material to exhibit a transmittance of less than 75%, at 560 nm, on a sheet with a thickness of 2 mm (according to Standard ISO 13468-2:2006).

In particular, the semicrystalline polyamide used in the present invention is chosen from: PA 4.10, PA 4.T, PA 6, PA 6.6, PA 4.6, PA 6.10, PA 6.12, PA 11, PA 12, PA 9.10, PA 9.12, PA 9.13, PA 9.14, PA 9.15, PA 9.16, PA 9.18, PA 9.36, PA 10.10, PA 10.12, PA 10.13, PA 10.14, PA 12.10, PA 12.12, PA 12.13, PA 12.14, PA 6.14, PA 6.13, PA 6.15, PA 6.16, PA 6.18, PA MXD.6, PA MXD.10, PA 12.T, PA 10.T, PA 9.T, PA 18.T, PA 6.T/6.6, PA 6.6/6.T/6.I and PA 6/6.T.

The said semicrystalline PA represents from 50% to 400% by weight, preferably from 100% to 300% by weight, preferably from 100% to 200% by weight, with regard to the total weight of the composition used according to the invention.

The term "amorphous polyamides" is understood to mean, within the meaning of the invention, transparent polyamides which are amorphous (ΔHm(2)=0 J/g) or not very semicrystalline (enthalpy of fusion during the DSC second heating of less than 30 J/g (ISO 11357-3:2013)), which are rigid (flexural modulus ISO>1300 MPa) and which do not distort under heat, at 60° C., as they have a glass transition temperature Tg of greater than 75° C. However, they are rather unresistant to impacts, exhibiting a much lower notched Charpy ISO impact in comparison with impact-modified polyamides, and their chemical resistance is not excellent, in particular due to their amorphous nature.

The amorphous polyamides are chosen from aliphatic, cycloaliphatic and aromatic polyamides or a mixture thereof.

Transparent amorphous polyamides (homopolyamides or copolyamides) (or PA) which can be used in the compositions according to the invention are described in particular in the patent documents EP1595907 and WO09153534. Mention may be made, as examples of transparent amorphous polyamides, of PA B.12, PA 11/B.14, PA 11/B.10 and 12/B.I/B.T.

Throughout the description, the expressions "amorphous polyamide(s) (or PA)", and "transparent amorphous polyamide(s) (or PA)" have the same meaning.

In one embodiment, the transparent amorphous polyamide comprises a mixture of at least one aliphatic amorphous polyamide and of at least one aromatic amorphous polyamide.

Preferably, the content by weight of aliphatic amorphous polyamide represents 10% to 80% of the total weight of the mixture of aliphatic amorphous polyamide and of aromatic amorphous polyamide.

Preferably, the transparent amorphous PAs used according to the invention are non-aromatic, this being the case in order not to increase the Tg of the composition, in order to facilitate the homogenization of the composition, not to increase the conversion or shaping temperature of the composition and not to risk damaging the other components of the composition.

According to the present invention, the amorphous PA comprises more than 50 mol % of an equimolar combination of at least one cycloaliphatic diamine and of at least one aliphatic dicarboxylic acid, preferably predominantly (to more than 50 mol %) linear, having from 10 to 36 carbon atoms, preferably from 10 to 18 carbon atoms.

This particular composition of the amorphous PA (content and chemistry) contributes in particular to the achievement of a transparency in accordance with (transmittance at least equal to 85%, and even at least 90%) the requirements of the invention.

According to a preferred embodiment, the amorphous PA used in the invention comprises more than 70 mol %, preferably more than 80 mol %, preferably more than 90 mol %, preferably 100 mol %, of an equimolar combination of at least one cycloaliphatic diamine and of at least one aliphatic dicarboxylic acid, preferably linear, having from 10 to 18 carbon atoms.

The said at least one cycloaliphatic diamine is advantageously chosen from: bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (abbreviated to "BMACM" or "MACM" or "B"), bis(p-aminocyclohexyl)methane (PACM), isopropylidenedi(cyclohexylamine) (PACP), isophoronediamine (IPD), 2,6-bis(aminomethyl)norbornane (BAMN), and their mixtures.

Advantageously, just one cycloaliphatic diamine, in particular bis(3-methyl-4-aminocyclohexyl)methane, is used as diamine for the preparation of the PA.

At least one non-cycloaliphatic diamine can participate in the composition of the monomers of the amorphous PAs, in a proportion of at most 30 mol %, with respect to the diamines of the said composition. Mention may be made, as non-cycloaliphatic diamine, of linear aliphatic diamines, such as 1,4-tetramethylenediamine, 1,6-hexamethylenediamine, 1,9-nonanediamine and 1,10-decamethylenediamine.

The aliphatic $C_{10}$ to $C_{18}$ dicarboxylic acid is preferably chosen from 1,10-decanedicarboxylic acid or sebacic acid, 1,12-dodecanedicarboxylic acid, 1,14-tetradecanedicarboxylic acid and 1,18-octadecanedicarboxylic acid.

The dicarboxylic acid can optionally be at least partially branched by at least one $C_1$ to $C_3$ alkyl group (having from 1 to 3 carbon atoms).

At least one nonaliphatic dicarboxylic acid can participate in the composition of the monomers of the amorphous PA.

In one embodiment, the nonaliphatic dicarboxylic acid is present in a proportion of at most 15 mol %, with respect to the dicarboxylic acids of the amorphous PAs. Preferably, the nonaliphatic dicarboxylic acid is chosen from aromatic diacids, in particular isophthalic acid (I), terephthalic acid (T) and their mixtures.

The term "monomer" in the present description of the polyamides has to be taken within the meaning of "repeat unit". This is because the case where a repeat unit of the PA is composed when the combination of a diacid with a diamine is special. It is considered that it is the combination of a diamine and of a diacid, that is to say the diamine.diacid pair (in equimolar amount), which corresponds to the monomer. This is explained by the fact that, individually, the diacid or the diamine is only a structural unit, which is not sufficient in itself alone to polymerize.

The said PAs can optionally comprise less than 50 mol % of at least one polyamide comonomer, that is to say a monomer having a different composition from the said predominant equimolar combination defined above.

Preferably, the said amorphous PA comprises less than 30 mol %, preferably less than 20 mol %, preferably less than 10 mol %, of polyamide comonomer(s), it being possible for the said at least one comonomer to be chosen from lactams, α,ω-aminocarboxylic acids, the diamine.diacid combinations other than that defined above, and their mixtures.

The lactam is, for example, chosen from caprolactam, oenantholactam and lauryllactam. The α,ω-aminocarboxylic acid is, for example, chosen from aminocaproic acid, 7-aminoheptanoic acid, 11-aminoundecanoic acid or 12-aminododecanoic acid.

Preferably, the amorphous PAs are essentially (to more than 80 mol %) formed from at least one monomer chosen from B.10, B.12, B.14, B.16, B.18, their random and/or block copolymers (copolyamides), and their mixtures.

The said amorphous PA represents from 200% to 800% by weight, preferably from 300% to 700% by weight, preferably from 400% to 700% by weight, with respect to the total weight of the composition used according to the invention.

Examples of types of amorphous polyamide resin comprise in particular: the polyamide PA 12/MACM.I (PA12/bis(3-methyl-4-aminocyclohexyl)methane, isophthalic acid), PA 12/MACM.T (PA12/bis(3-methyl-4-aminocyclohexyl)methane, terephthalic acid), PA MACM.12 bis(3-methyl-4-aminocyclohexyl)methane, dodecanedicarboxylic acid), PA PACM.12 (4,4-bis(aminocyclohexylmethane), dodecanedicarboxylic acid), PA 6.I/6.T and PA 6.I/6.T/MACM.I. Use may be made of the PAs available on the market, such as Grilamid TR55®, comprising PA 12/MACM.I, Grilamid TR90®, comprising PA MACM.12, manufactured by EMS Chemie, and Trogamid CX®, manufactured by Evonik Degussa-Chemie, comprising PA PACM.12, and Rilsan® Clear, comprising PA 12/MACM.I/MACM.T (manufactured by Arkema).

The term "glass filler" is understood to mean, within the meaning of the invention, any glass filler, in particular as described by Frederick T. Wallenberger, James C. Watson and Hong Li, PPG industries Inc. (ASM Handbook, Vol. 21: composites (#06781G), 2001 ASM International), on condition that the transparency of the amorphous polyamide resin comprising the said glass filler and additionally comprising a semicrystalline polyamide according to the invention, as determined by the measurement of the transmittance according to standard ISO 13468-2:2006, is greater than the transparency of solely the said amorphous polyamide resin comprising the said glass filler as determined by the measurement of the transmittance according to standard ISO 13468-2:2006.

In one embodiment, the said glass filler comprises (indeed even consists of), expressed as % by weight, 60.0 to 65.5% of silicon dioxide ($SiO_2$), 23.0 to 25.0% of aluminium oxide ($Al_2O_3$), 0.0 to 5.0% of boron oxide ($B_2O_3$), 0.0 to 9.0% of calcium oxide (CaO), 0.0 to 5.0% of zinc oxide (ZnO), 0.0 to 1.0% of zirconium oxide ($Zr_2O_3$), 0.0 to 5.0% of strontium oxide (SrO), 0.0 to 1.0% of barium oxide (BaO), 6.0 to 11.0% of magnesium oxide (MgO), 0.0 to 5.0% of lithium oxide ($Li_2O$), 0.0 to 0.1% of sodium oxide ($Na_2O$), 0.0 to 10.0% of potassium oxide ($K_2O$) and 0.0 to 0.1% of iron oxide ($Fe_2O_3$).

In another embodiment, said filler comprises (indeed even consists of), expressed as % by weight, 68.0 to 74.0% of silicon dioxide ($SiO_2$), 2.0 to 5.0% of aluminium oxide ($Al_2O_3$), 2.0 to 5.0% of boron oxide ($B_2O_3$), 2.00 to 10.0% of calcium oxide (CaO), 0.0 to 5.0% of zinc oxide (ZnO), 0 to 5% of strontium oxide (SrO), 0.0 to 1.0% of barium oxide (BaO), 1 to 5% of magnesium oxide (MgO), 0 to 5% of lithium oxide ($Li_2O$), 5.0 to 12.0% of sodium oxide ($Na_2O$), and 0.0 to 10.0% of potassium oxide ($K_2O$), where the total amount of lithium oxide ($Li_2O$), sodium oxide ($Na_2O$), and potassium oxide ($K_2O$) is 8.0 to 12.0%.

In one embodiment, the difference in refractive indices between the glass filler and the composition of the invention is 0.010 or less with respect to light having a wavelength of 589 nm; 0.010 or less with respect to light having a wavelength of 486 nm, and 0.010 or less with regard to light having a wavelength of 656 nm.

The refractive index is measured at 23° C., at a given wavelength, on an Abbe refractometer from Atago (Model NAR_1T SOLID).

Preferably, the difference in refractive indices between the glass filler and the composition of the invention is 0.006 or less with respect to light having a wavelength of 589 nm; 0.006 or less with respect to light having a wavelength of 486 nm, and 0.006 or less with regard to light having a wavelength of 656 nm.

Preferably, the difference in refractive indices between the glass filler and the composition of the invention is 0.002 or less with respect to light having a wavelength of 589 nm; 0.002 or less with respect to light having a wavelength of 486 nm; and 0.002 or less as regards light having a wavelength of 656 nm.

In one embodiment, the amorphous polyamide resin composition of the present invention uses a glass filler exhibiting, in its composition, a total content of calcium oxide (CaO) and magnesium oxide (MgO) of 6 to 20% by weight, with respect to the total weight of the glass filler.

It is clearly understood that the preparation of the composition is not limited to the addition of semicrystalline polyamide to the amorphous polyamide comprising glass as filler. It can also be prepared by prior mixing of the semicrystalline polyamide and of the amorphous polyamide and addition of the glass filler.

The expression "the amorphous polyamide resin composition of the present invention" denotes only the amorphous polyamide comprising glass as filler before addition of the semicrystalline polyamide.

Preferably, the amorphous polyamide resin composition of the present invention uses a glass filler exhibiting, in its composition, a total content of silicon dioxide ($SiO_2$) and of aluminium oxide ($Al_2O_3$) of 83.0 to 90.5% by weight with respect to the total weight of the glass filler.

Advantageously, the amorphous polyamide resin composition of the present invention uses a glass filler having a total content of silicon dioxide ($SiO_2$) of 60.0 to 65.5% expressed in terms of oxides as % by weight of the glass filler.

Advantageously, the amorphous polyamide resin composition of the present invention uses a glass filler having a content of $Na_2O$ of 0.0 to 0.1% with respect to the total weight of the glass filler.

Advantageously, the amorphous polyamide resin composition of the present invention uses a glass filler having a content of $Al_2O_3$ of 23.0 to 25.0% with respect to the total weight of the glass filler.

Advantageously, the amorphous polyamide resin composition of the present invention uses a glass filler having a content of CaO of 0.0 to 9.0% with respect to the total weight of the glass filler.

Advantageously, the amorphous polyamide resin composition of the present invention uses a glass filler having a content of MgO of 6.0 to 11.0% with respect to the total weight of the glass filler.

Advantageously, the amorphous polyamide resin composition of the present invention uses a glass filler having a content of $B_2O_3$ of 0.0 to 5.0% with respect to the total weight of the glass filler.

Advantageously, the amorphous polyamide resin composition of the present invention uses a glass filler having a total content of lithium oxide ($Li_2O$), of sodium oxide ($Na_2O$) and of potassium oxide ($K_2O$) of 0.0 to 0.1% with respect to the total weight of the glass filler.

In another embodiment, the amorphous polyamide resin composition of the present invention uses a glass filler exhibiting, in its composition, a total content of calcium oxide (CaO) and magnesium oxide (MgO) of 3.0 to 15.0% by weight, with respect to the total weight of the glass filler composition.

Preferably, the amorphous polyamide resin composition of the present invention uses a glass filler exhibiting, in its composition, a total content of silicon dioxide ($SiO_2$) and aluminium oxide ($Al_2O_3$) of 70.0 to 79.0% by weight, with respect to the weight of the glass filler composition.

Preferably, the amorphous polyamide composition of the present invention uses a glass filler which is, in its composition, substantially or completely free from titanium oxide ($TiO_2$).

Preferably, the transparent polyamide composition of the present invention has a content of glass filler of 5.0 to 40.0% by weight, preferably 5.0 to 30.0%, in particular 5.0 to 20.0% with respect to the total weight of the composition used according to the invention.

In one embodiment, the transparent composition according to the invention comprises, with respect to the total weight of the composition:
from 5.0 to 40.0% by weight, preferably from 10.0 to 30.0% by weight, preferably from 10.0 to 20.0% by weight of semicrystalline polyamide,
from 20.0 to 80.0% by weight, of at least one amorphous, transparent and at least partially cycloaliphatic polyamide,
from 5.0 to 40.0% by weight of glass filler.

In one embodiment, the transparent composition according to the invention comprises, with respect to the total weight of the composition used according to the invention:
from 5.0 to 40.0% by weight, preferably from 10.0 to 30.0% by weight, preferably from 10.0 to 20.0% by weight of semicrystalline polyamide, from 20.0 to 80.0% by weight of at least one amorphous, transparent and at least partially cycloaliphatic polyamide, from 5.0 to 30.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 20.0 to 80.0% by weight of at least one amorphous, transparent and at least partially cycloaliphatic polyamide, from 5.0 to 20.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 30.0 to 70.0% by weight of at least one amorphous, transparent and at least partially cycloaliphatic polyamide, from 5.0 to 40.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 30.0 to 70.0% by weight of at least one amorphous, transparent and at least partially cycloaliphatic polyamide, from 5.0 to 30.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 30.0 to 70.0% by weight of at least one amorphous, transparent and at least partially cycloaliphatic polyamide, from 5.0 to 20.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 40.0 to 70.0% by weight of at least one amorphous, transparent and at least partially cycloaliphatic polyamide, from 5.0 to 40.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 40.0 to 70.0% by weight of at least one amorphous, transparent and at least partially cycloaliphatic polyamide, from 5.0 to 30.0% by weight of glass filler.

In one embodiment, the transparent composition according to the invention comprises, with respect to the total weight of the composition used according to the invention:

from 5.0 to 40.0% by weight, preferably from 10.0 to 30.0% by weight, preferably from 10.0 to 20.0% by weight of semicrystalline polyamide, from 40.0 to 70.0% by weight of at least one amorphous, transparent and at least partially cycloaliphatic polyamide, from 5.0 to 20.0% by weight of glass filler.

Advantageously, the compositions of the invention defined above optionally comprise from 0.0 to 5.0% by weight of PEBA.

Advantageously, the compositions defined above comprise from 0.0 to 5.0% by weight of additives.

Advantageously, the compositions of the invention defined above optionally comprise from 0 to 5.0% by weight of PEBA and from 0.0 to 5.0% by weight of additives.

Advantageously, the compositions defined above comprise from 0.1 to 5.0% by weight of PEBA.

Advantageously, the compositions of the invention defined above comprise from 0.1 to 5.0% by weight of additives.

Advantageously, the compositions of the invention defined above comprise from 0.1 to 5.0% by weight of PEBA and from 0.1 to 5.0% by weight of additives.

Advantageously, the glass filler used in the composition according to the invention comprises at least one component chosen from: a glass fibre, a glass powder, a glass flake, a milled fibre and a glass bead.

Another subject-matter of the present invention is a moulded article manufactured by moulding the composition according to the invention.

The very small difference between the refractive indices of the composition of the invention and the glass filler makes it possible to obtain a moulded product having a very high transparency.

The refractive index of the composition comprising the amorphous polyamide resin is preferably: from 1.505 to 1.545 with respect to light having a wavelength of 589 nm; 1.512 to 1.555 with respect to light having a wavelength of 486 nm and 1.502 to 1.541 with respect to light having a wavelength of 656 nm. In particular, in order to reduce the differences between the refractive indices between the resin component and glass filler, the refractive indices of the resin component comprising the amorphous polyamide resin are particularly preferably: from 1.507 to 1.540, in particular from 1.508 to 1.520 with respect to light having a wavelength of 589 nm; 1.515 to 1.527 with respect to light having a wavelength of 486 nm, and from 1.505 to 1.517 with respect to light having a wavelength of 656 nm.

In one embodiment, the glass filler used in the polyamide composition of the present invention comprises or is composed of, expressed in terms of oxides as % by weight, with respect to the weight of the composition: 68.0 to 74.0% of silicon dioxide ($SiO_2$), 2.0 to 5.0% of aluminium oxide ($Al_2O_3$), 2.0 to 5.0% of boron oxide ($B_2O_3$), 2.0 to 10.0% of calcium oxide (CaO), 0.0 to 5.0% of zinc oxide (ZnO), 0.0 to 5.0% of strontium oxide (SrO), 0.0 to 1.0% of barium oxide (BaO), 1.0 to 5.0% of magnesium oxide (MgO), 0.0 to 5.0% of lithium oxide ($Li_2O$), 5.0 to 12.0% of sodium oxide ($Na_2O$), and 0.0 to 10.0% of potassium oxide ($K_2O$), where the total amount of lithium oxide ($Li_2O$), sodium oxide ($Na_2O$), and potassium oxide ($K_2O$) is 8.0 to 12.0%.

The glass filler preferably comprises silicon dioxide ($SiO_2$) according to a concentration of 68.0 to 74.0%, and preferably 68.0 to 72.0%. If the content of silicon dioxide ($SiO_2$) is less than 68.0%, it is difficult to bring the refractive index of the glass filler into correspondence with that of the amorphous polyamide resin. On the other hand, if the content of silicon dioxide ($SiO_2$) exceeds 74.0%, the solubility of the glass filler in the composition is greatly reduced. In particular, in the case where the glass filler is used in the form of glass fibre, the spinning temperature is high, which results in production difficulties.

The glass filler preferably comprises aluminium oxide ($Al_2O_3$) according to a concentration of 2.0 to 5.0% and preferably of 2.0 to 4.0%. If the content of aluminium oxide ($Al_2O_3$) is less than 2.0%, the chemical resistance to water is reduced.

On the other hand, if the content of aluminium oxide ($Al_2O_3$) is greater than 5.0%, the glass has a tendency to be heterogeneous.

The total content of silicon dioxide ($SiO_2$) and aluminium oxide ($Al_2O_3$) is preferably from 70.0 to 79.0% and more preferably 71.0 to 76.0%. It is then easy to bring together the refractive index of the glass filler and the refractive index of the amorphous polyamide resin.

Advantageously, the glass filler comprises sodium oxide ($Na_2O$) according to a content of 5.0 to 12.0% and preferably of 8.0 to 11.0%. If the content of sodium oxide ($Na_2O$) exceeds 12.0%, the resistance to water of the glass has a tendency to decrease. On the other hand, if the content of sodium oxide ($Na_2O$) is less than 5.0%, it is difficult to bring together the refractive index of the glass filler and the refractive index of the amorphous polyamide resin.

In another embodiment, the glass filler used in the composition comprises or consists of, expressed as % by weight, 60.0 to 65.5% of silicon dioxide ($SiO_2$), 23.0 to 25.0% of aluminium oxide ($Al_2O_3$), 0.0 to 5.0% of boron oxide ($B_2O_3$), 0.0 to 9.0% of calcium oxide (CaO), 0.0 to 5.0% of zinc oxide (ZnO), 0.0 to 1.0% of zirconium oxide ($Zr_2O_3$), 0.0 to 5.0% of strontium oxide (SrO), 0.0 to 1.0% of barium oxide (BaO), 6.0 to 11.0% of magnesium oxide (MgO), 0.0 to 5.0% of lithium oxide ($Li_2O$), 0.0 to 0.1% of sodium oxide ($Na_2O$), 0.0 to 10.0% of potassium oxide ($K_2O$) and 0.0 to 0.1% of iron oxide ($Fe_2O_3$).

The lower proportion of $SiO_2$ in the latter embodiment is compensated for by a higher proportion of $Al_2O_3$, thus making it possible to make the refractive index of the glass filler correspond with that of the composition of the invention.

Preferably, in the latter embodiment, the glass filler used comprises a total content of silicon dioxide ($SiO_2$) and of aluminium oxide ($Al_2O_3$) of 83.0 to 90.5% by weight with respect to the weight of the composition.

Whatever the embodiment, the glass filler can comprise lithium oxide ($Li_2O$) according to a concentration of 0.0 to 5.0% and preferably of 0.0 to 2.0%. The glass filler can comprise potassium oxide ($K_2O$) according to a concentration of 0.0 to 10.0% and preferably of 0.0 to 5.0%. The sodium oxide ($Na_2O$) can be partially replaced by lithium oxide ($Li_2O$) or potassium oxide ($K_2O$), which makes it possible to improve the resistance to water of the glass.

The glass filler can comprise alkali metal components, lithium oxide ($Li_2O$), sodium oxide ($Na_2O$), and potassium oxide ($K_2O$) according to a concentration of 8.0 to 12.0% and preferably of 8.0 to 11.0% in total. If the total amount of the alkali metal components is greater than 12.0%, the resistance to water of the glass has a tendency to decrease. On the other hand, if the total amount of the alkali metal components is less than 8.0%, it is difficult to produce the glass filler as the glass becomes difficult to melt.

Preferably, the glass filler comprises calcium oxide (CaO) according to a concentration of 0.0 to 9.0%, in particular of 2.0 to 10.0% and preferably of 6.0 to 9.0%. If the content of calcium oxide (CaO) is less than 2.0%, the ability of the glass to melt has a tendency to decrease but is still sufficient. On the other hand, if the content of calcium oxide (CaO) exceeds 10.0%, it is difficult to bring together the refractive index of the glass filler and the refractive index of the amorphous polyamide resin.

The zinc oxide (ZnO) is an optional component and the glass filler can comprise zinc oxide according to a concentration of 0.0 to 5.0%, preferably of 0.0 to 2.0%. The addition of zinc oxide (ZnO) can improve the resistance to water of the glass. However, it is preferable to avoid the content of zinc oxide (ZnO) from exceeding this upper limit because the glass has a tendency to be devitrified.

Strontium oxide (SrO) is an optional component and the glass filler can comprise strontium oxide according to a concentration of 0.0 to 5.0% and preferably of 0.0 to 2.0%.

Barium oxide (BaO) is an optional component and the glass filler can comprise barium oxide according to a concentration of 0.0 to 1.0%.

The total content of calcium oxide (CaO), zinc oxide (ZnO), strontium oxide (SrO) and barium oxide (BaO) is preferably of 4.0 to 10.0%, in particular of 4.0 to 10.0% and better still of 6.0 to 10.0%. If the total content of these elements is less than 4.0%, the ability of the glass to melt is reduced but is still acceptable. On the other hand, if their content exceeds 10.0%, it is difficult to bring together the refractive index of the glass filler and the refractive index of the amorphous polyamide resin.

The glass filler preferably comprises magnesium oxide (MgO) according to a concentration of 1.0 to 5.0% and preferably of 1.0 to 3.0% or according to a concentration of 6.0 to 11.0%. The addition of magnesium oxide (MgO) can improve the mechanical properties of the glass. A content of magnesium oxide (MgO) exceeding 5.0% is not recommended as the ability of the glass to melt tends to decrease but is still acceptable.

The glass filler may or may not contain boron oxide ($B_2O_3$).

The glass filler preferably comprises boron oxide ($B_2O_3$) according to a concentration of 2.0 to 5.0% and preferably of 2.0 to 4.0%. A content of boron oxide ($B_2O_3$) of less than 2.0% is not desirable as it becomes difficult to bring together the refractive index of the glass filler and the refractive index of the amorphous polyamide resin. It is then necessary to vary the proportions of the other constituents of the glass fibre in order to bring the refractive index of the glass filler closer to the refractive index of the amorphous polyamide resin, or to use amorphous polyamide mixtures.

A content of boron oxide ($B_2O_3$) exceeding 5.0% is not preferred because of the formation of volatile compounds during the melting of the glass, which can result in problems of corrosion of the production plants or requires additional equipment for the collecting of the volatile compounds.

The $TiO_2$ content of the glass filler is preferably less than 0.1%.

Ideally, the glass filler is devoid of titanium oxide ($TiO_2$) in order to prevent coloration phenomena.

The glass filler or the composition of the present invention can comprise one or more component(s) other than the components mentioned above, such as, for example, an oxide of a metal such as Fe, Co, Ni, Sn, Zr or Mo.

The glass filler described above used according to the present invention has a refractive index of 1.505 to 1.545 with respect to light having a wavelength of 589 nm, a refractive index of 1.512 to 1.555 with respect to light having a wavelength of 486 nm, and a refractive index of 1.502 to 1.541 with respect to light having a wavelength of 656 nm, and these refractive indices are virtually the same as those of the amorphous polyamide resins. In particular, in order to reduce the differences between the refractive indices between the resin component and the glass filler component, the refractive indices of the resin component containing the amorphous polyamide resin are particularly preferably: from 1.507 to 1.540, in particular from 1.508 to 1.520 with respect to light having a wavelength of 589 nm; 1.515 to 1.527 with respect to light having a wavelength of 486 nm, and from 1.505 to 1.517 with respect to light having a wavelength of 656 nm.

Consequently, the glass filler can be used in the production of an (injection-) moulded product polyamide resin of the invention having a high transparency and an excellent mechanical strength.

For example, if the glass filler comprises 68.0 to 72.0% of silicon dioxide ($SiO_2$), 2.0 to 4.0% of aluminium oxide ($Al_2O_3$), 2.0 to 4.0% of boron oxide ($B_2O_3$), 6.0 to 9.0% of calcium oxide (CaO), 0.0 to 2.0% of zinc oxide (ZnO), 0.0 to 2.0% of strontium oxide (SrO), 0.0 to 1.0% of barium oxide (BaO), 1.0 to 3.0% of magnesium oxide (MgO), 0.0 to 2.0% of lithium oxide ($Li_2O$), 8.0 to 11.0% of sodium oxide ($Na_2O$), and 0.0 to 5.0% of potassium oxide ($K_2O$), the glass filler has a tendency to have a refractive index of 1.508 to 1.520 with respect to light having a wavelength of 589 nm, a refractive index of 1.515 to 1.527 with respect to light having a wavelength of 486 nm and a refractive index of 1.505 to 1.517 with respect to light having a wavelength of 656 nm.

In another example, if the glass filler contains 60.0 to 65.5% of silicon dioxide ($SiO_2$), 23.0 to 25.0% of aluminium oxide ($Al_2O_3$), 0.0 to 5.0% of boron oxide ($B_2O_3$), 0.0 to 9.0% of calcium oxide (CaO), 0.0 to 5.0% of zinc oxide (ZnO), 0.0 to 1.0% of zirconium oxide ($Zr_2O_3$), 0.0 to 5.0% of strontium oxide (SrO), 0.0 to 1.0% of barium oxide (BaO), 6.0 to 11.0% of magnesium oxide (MgO), 0.0 to 5.0% of lithium oxide ($Li_2O$), 0.0 to 0.1% of sodium oxide ($Na_2O$), 0.0 to 10.0% of potassium oxide ($K_2O$) and 0.0 to 0.1% of iron oxide ($Fe_2O_3$), the glass filler has a tendency to have a refractive index of 1.508 to 1.523 with respect to light having a wavelength of 589 nm.

The silicon dioxide ($SiO_2$), the aluminium oxide ($Al_2O_3$) and the alkali metal components can reduce the refractive index of the glass filler. Examples of components which can reduce the refractive index of the glass filler other than the components mentioned above comprise $P_2O_5$ and $F_2$.

Consequently, in the case where the refractive index of the glass filler is smaller than the refractive index desired, namely the refractive index of the amorphous polyamide resin, the refractive index can be increased, for example, by replacing a portion of the silicon dioxide ($SiO_2$) with calcium oxide (CaO). For example, if 0.4% of calcium oxide (CaO) is substituted for 0.4% of silicon dioxide ($SiO_2$), the refractive index of the glass filler increases by approximately 0.002. In the case where the refractive index of the glass filler is higher than the refractive index desired, namely the refractive index of the amorphous polyamide resin, the refractive index can be lowered, for example, by replacing a portion of the calcium oxide (CaO) with an alkali metal compound. Specifically, for example, if 0.8% of sodium oxide ($Na_2O$) is substituted for 0.5% of calcium oxide (CaO), the refractive index of the glass filler decreases by approximately 0.002.

The refractive index of the glass filler can be appropriately adjusted and it is possible to produce a glass filler having the same refractive index range as the refractive index of the amorphous polyamide resin.

In the present invention, the glass filler used can comprise (indeed even be composed of): a glass fibre, glass powder, glass flakes, milled fibre or a glass bead. Among these possible forms of the glass filler, the glass fibre is preferred for its mechanical strength. It is similar to a conventional reinforcing fibre, such as glass fibre E, and is highly effective in the reinforcing of the moulded product amorphous polyamide resin. Another preferred fibre is an S-type, in particular S-2-type, glass fibre sold by AGY. The glass fibre can be produced by any spinning process conventionally known for a continuous glass fibre. For example, it is possible to fibrillate the glass by different processes, such as the direct melting process, in which the glass is subjected to continuous vitrification in a furnace, then introduced into a crucible and subjected to spinning by a bushing fitted to the lower part of the crucible, and the remelting process, in which melted glass is transformed into a bead or a rod, followed by remelting and spinning.

The diameter of the glass fibre is preferably from 5 to 50 μm, preferably from 10 to 45 μm.

Glass powder can be produced by any production process, such as melting of glass, followed by granulation in water. The average size of the particles is preferably from 1 to 100 μm as determined using a laser diffraction particle size analyser or according to ISO 13320-1:2009.

The glass filler can also be in the form of glass flakes, which can be produced by any conventional production process, in particular by spraying the molten mass. The thickness of the glass flakes is preferably from 0.1 to 10 μm.

Milled fibres can be produced by any known conventional process. For example, a milled fibre can be produced by pulverizing a strand of a glass fibre using a hammer mill or a bead mill. The diameter of the fibre and the length to diameter ratio of the milled fibre are preferably from 5 to 50 μm and from 2 to 150, respectively.

Glass beads can be produced by any production process conventionally known, for example by melting and spraying the molten glass mass. The size of the particles of the glass beads is preferably from 5 to 300 μm.

In the present invention, two or more forms of fillers chosen from: the glass fibre, the glass powder, the glass flakes, the milled fibre and the glass beads, can be used in combination as glass filler.

Advantageously, the glass filler is surface-treated with a coupling agent in order to increase the affinity and the adhesion between the resin component comprising the amorphous polyamide resin and the glass fibre, which prevents any decrease in the transparency of the moulded product caused by the formation of voids.

Mention may be made, as coupling agent, of those based on silane, on borane, on aluminates, those of titanate type, and the like. In particular, the silane coupling agents are preferred as they make possible good adhesion between the amorphous polyamide resin and the glass filler. Use may be made, as coupling agent of silane type, of aminosilane, epoxysilane and acrylsilane coupling agents and the like. Among silane coupling agents, aminosilane coupling agents are preferred.

In addition, the treatment of the fillers can optionally comprise film-forming agents, lubricating agents, antistatic agents and the like, in addition to the coupling agent. These components can be used alone or in combination. Mention may be made, as examples of film-forming agent, of vinyl acetate, urethane, acrylic, polyester, polyether, phenoxy, polyamide and epoxy resins and/or the like. Mention may be made, as examples of lubricating agent, of aliphatic ester, aliphatic ether, aromatic ester or aromatic ether surfaceactive agents. Mention may be made, as examples of antistatic agent, of inorganic salts, such as lithium chloride or potassium iodide, and also quaternary ammonium salts, such as ammonium chloride or ammonium ethosulphate.

In the present invention, the content of glass filler in the polyamide composition is preferably from 5.0 to 40.0% by weight, in particular from 5.0 to 30.0%, preferably from 5.0 to 20.0% by weight, with respect to the total weight of the composition. If the content of the glass filler is less than 5.0% by weight, the moulded product obtained by moulding the polyamide resin composition has a tendency to have poor mechanical properties, whereas, if the content of glass filler is greater than 40% by weight, the contact surface area between the resin and the glass filler is increased, which tends to reduce the ability to be moulded and the transparency of the moulded product obtained.

When the amount of the glass filler in the polyamide composition is within the abovementioned range, it is possible to produce a moulded product simultaneously combining good mechanical properties and an excellent transparency.

The composition according to the invention can additionally comprise at least one copolymer comprising PE block(s) and PA block(s), hereinafter PEBA comprising one or more PE blocks and one or more PA blocks.

The "copolymers comprising polyether blocks and polyamide blocks", abbreviated to "PEBA", result from the polycondensation of polyamide blocks comprising reactive ends with polyether blocks comprising reactive ends, such as, inter alia:

1) polyamide blocks comprising diamine chain ends with polyoxyalkylene blocks comprising dicarboxyl chain ends, 2) polyamide blocks comprising dicarboxyl chain ends with polyoxyalkylene blocks comprising diamine chain ends, which are obtained by cyanoethylation and hydrogenation of aliphatic $\alpha,\omega$-dihydroxylated polyoxyalkylene blocks, known as polyetherdiols, 3) polyamide blocks comprising dicarboxyl chain ends with polyetherdiols, the products obtained being, in this specific case, polyetheresteramides.

The polyamide blocks comprising dicarboxyl chain ends originate, for example, from the condensation of precursors of polyamides in the presence of a chain-limiting dicarboxylic acid. The polyamide blocks comprising diamine chain ends originate, for example, from the condensation of precursors of polyamides in the presence of a chain-limiting diamine.

The number-average molar mass Mn of the polyamide blocks is between 400 and 20 000 g/mol, preferably between 500 and 10 000 g/mol.

The polymers comprising polyamide blocks and polyether blocks can also comprise randomly distributed units.

Use may be advantageously made of three types of polyamide blocks.

According to a first type, the polyamide blocks originate from the condensation of a dicarboxylic acid, in particular those having from 4 to 20 carbon atoms, preferably those having from 6 to 18 carbon atoms, and of an aliphatic or arylaliphatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, 1,2-cyclohexyldicarboxylic acid, 1,4-butanedioic, adipic, azelaic, suberic, sebacic, 1,12-dodecanedicarboxylic, 1,14-tetradecanedicarboxylic and 1,18-octadecanedicarboxylic acids, terephthalic and isophthalic acids, haphthalenedicarboxylic acid, but also dimerized fatty acids.

Mention may be made, as examples of diamines, of 1,5-tetramethylenediamine, 1,6-hexamethylenediamine, 1,10-decamethylenediamine, 1,12-dodecamethylenediamine, trimethyl-1,6-hexamethylenediamine, 2-methyl-1,5-pentamethylenediamine, the isomers of bis(3-methyl-4-aminocyclohexyl)methane (BMACM), and 2,2-bis(3-methyl-4-aminocyclohexyl)propane (BMACP), and bis (para-aminocyclohexyl)methane (PACM), and isophoronediamine (IPD), 2,6-bis(aminomethyl)norbornane (BAMN), and piperazine (Pip), and meta-xylylenediamine (MXD), and para-xylylenediamine (PXD).

The following blocks advantageously exist: PA 4.12, PA 4.14, PA 4.18, PA 6.10, PA 6.12, PA 6.14, PA 6.18, PA 9.12, PA 10.10, PA 10.12, PA 10.14, PA 10.18, MXD.6, PXD.6, MXD.10 and PXD.10.

According to a second type, the polyamide blocks result from the condensation of one or more $\alpha,\omega$-aminocarboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam, and lauryllactam. Mention may be made, as examples of $\alpha,\omega$-aminocarboxylic acid, of aminocaproic, 7-aminoheptanoic, 11-aminoundecanoic and 12-aminododecanoic acids.

Advantageously, the polyamide blocks of the second type are of polyamide 11, of polyamide 12 or of polyamide 6.

According to a third type, the polyamide blocks result from the condensation of at least one $\alpha,\omega$-aminocarboxylic acid (or one lactam), at least one diamine and at least one dicarboxylic acid.

In this case, the polyamide PA blocks are prepared by polycondensation:
of the linear aliphatic or aromatic diamine or diamines having X carbon atoms;
of the dicarboxylic acid or acids having Y carbon atoms; and
of the comonomer or comonomers {Z} chosen from the lactams and the $\alpha,\omega$-aminocarboxylic acids having Z carbon atoms and the equimolar mixtures of at least one diamine having X1 carbon atoms and of at least one dicarboxylic acid having Y1 carbon atoms, (X1, Y1) being different from (X, Y),
the said comonomer or comonomers {Z} being introduced in a proportion by weight ranging up to 50%, preferably up to 20% or more advantageously still up to 10%, with respect to the combined polyamide precursor monomers;
in the presence of a chain-limiting agent chosen from dicarboxylic acids.

Use is advantageously made, as chain-limiting agent, of the dicarboxylic acid having Y carbon atoms, which is introduced in excess with respect to the stoichiometry of the diamine or diamines.

According to an alternative form of this third type, the polyamide blocks result from the condensation of at least two $\alpha,\omega$-aminocarboxylic acids or of at least two lactams having from 6 to 12 carbon atoms or of a lactam and of an aminocarboxylic acid not having the same number of carbon atoms, in the optional presence of a chain-limiting agent. Mention may be made, as example of aliphatic $\alpha,\omega$-aminocarboxylic acid, of aminocaproic, 7-aminoheptanoic, 11-aminoundecanoic and 12-aminododecanoic acids. Mention may be made, as example of a lactam, of caprolactam, oenantholactam, and lauryllactam. Mention may be made, as example of aliphatic diamines, of hexamethylenediamine, dodecamethylenediamine and trimethylhexamethylenediamine. Mention may be made, as example of cycloaliphatic diacids, of 1,4-cyclohexanedicarboxylic acid. Mention may be made, as example of aliphatic diacids, of butanedioic, adipic, azelaic, suberic, sebacic and dodecanedicarboxylic acids, dimerized fatty acids (these dimerized fatty acids preferably have a dimer content of at least 98%; preferably, they are hydrogenated; they are sold under the "Pripol" trade name by "Uniqema" or under the "Empol" trade name by Henkel) and polyoxyalkylene-α,ω-diacids. Mention may be made, as example of aromatic diacids, of terephthalic (T) and isophthalic (I) acids. Mention may be made, as example of cycloaliphatic diamines, of the isomers of bis(3-methyl-4-aminocyclohexyl)methane (BMACM) and 2,2-bis(3-methyl-4-aminocyclohexyl)propane (BMACP), and bis (para-aminocyclohexyl)methane (PACM). The other diamines commonly used can be isophoronediamine (IPD), 2,6-bis(aminomethyl)norbornane (BAMN) and piperazine. Mention may be made, as examples of arylaliphatic diamines, of meta-xylylenediamine (MXD) and para-xylylenediamine (PXD).

Mention may be made, as examples of polyamide blocks of the third type, of the following:
- 6.6/6, in which 6.6 denotes hexamethylenediamine units condensed with adipic acid and 6 denotes units resulting from the condensation of caprolactam.
- 6.6/6.10/11/12, in which 6.6 denotes hexamethylenediamine condensed with adipic acid, 6.10 denotes hexamethylenediamine condensed with sebacic acid, 11 denotes units resulting from the condensation of aminoundecanoic acid and 12 denotes units resulting from the condensation of lauryllactam.

The said PE blocks represent from 10 to 80% by weight, preferably from 20 to 60% by weight, preferably from 20 to 40% by weight, with respect to the total weight of the copolymer.

The number-average molecular weight of the PE blocks is between 200 and 1000 g/mol (limits excluded), preferably within the range from 400 to 800 g/mol (limits included), preferably from 500 to 700 g/mol.

The PE (polyether) blocks result, for example, from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG) and their mixtures or their copolymers. The PE blocks can comprise polyoxyalkylene sequences comprising $NH_2$ chain ends, it being possible for such sequences to be obtained by cyanoacetylation of aliphatic α,ω-dihydroxylated polyoxyalkylene sequences, known as polyetherdiols. More particularly, use may be made of Jeffamines (for example, Jeffamine® D400, D2000, ED 2003 or XTJ 542, commercial products from Huntsman).

The said at least one PE block preferably comprises at least one polyether chosen from polyalkylene ether polyols, such as PEG, PPG, PO3G, PTMG, polyethers comprising polyoxyalkylene sequences comprising $NH_2$ chain ends, their random and/or block copolymers (copolyethers) and their mixtures.

A subject-matter of the present invention is in particular a composition comprising:
- from 5.0 to 40.0% by weight of semicrystalline polyamide as defined above,
- from 20.0 to 80.0% by weight of at least one amorphous, transparent and at least partially cycloaliphatic, preferably nonaromatic, polyamide,
- from 5.0 to 40.0%, preferably from 5 to 30%, by weight of glass filler,
- from 0.0 to 5.0% of PEBA,
- from 0.0 to 5.0% of additives, with respect to the total weight of the composition, and its use for the manufacture of an article having a transparency in accordance with that defined above according to the invention.

The chemical composition of the said amorphous polyamide is preferably chosen from the compositions already described for the polyamide blocks of the above PEBAs, which ensures the compatibility of the PA with the PEBA.

The addition of such a content of block copolymer to the composition according to the invention makes it possible to improve the processability of the composition: improved fluidity (or flow capability) and improved ductility, while retaining its transparency properties. The injection moulding of the composition according to the invention is easy and results in very little shrinkage of material after injection moulding, which makes it possible to obtain parts of high dimensional accuracy.

The said semicrystalline PA, the amorphous PA and the optional PEBA used in the composition of the invention preferably have substantially the same refractive index, measured according to Standard ISO 489:1999. It is also possible to vary the nature of the starting materials used to synthesize the PEBA and the PA. Generally, the addition of an aromatic compound (for example an aromatic diacid) increases the refractive index of a product. For the PEBAs, the refractive index decreases if, for example, the PTMG content is increased, in comparison with the pure PA having the same composition as the PA block of the PEBA. In the series of the PAs of BMACM.Y type, Y being an aliphatic diacid, the longer Y is, the more the refractive index falls. For a linear aliphatic PA, the more the $CH_2$ number increases in the unit, the more the refractive index falls.

If there exists an additive other than a glass filler or a PEBA in the composition, this additive is present from 0.01 to 5.0% by weight, with respect to the total weight of the composition. The additive is chosen in particular from colouring agents, in particular pigments, dyes, effect pigments, such as diffractive pigments, interference pigments, such as pearlescent agents, reflective pigments and mixtures thereof; UV stabilizers, anti-ageing agents, antioxidants, fluidizing agents, anti-abrasion agents, mould-release agents, stabilizers, plasticizers, impact modifiers, surfactants, brighteners, fillers, fibres, waxes and mixtures thereof, and/or any other additive well known in the field of polymers.

Mention may in particular be made, among the fillers other than the glass fillers described above, of silica, carbon black, carbon nanotubes, expanded graphite or else titanium oxide.

The use according to the invention makes it possible to obtain a more transparent article which is easier to process than an article of the same shape made of amorphous polyamide comprising glass as filler, as demonstrated in the tables of the examples below.

According to an advantageous embodiment, the combination of the invention is manufactured by compounding or else by dry blending its various components. Dry blending is preferred as it comprises fewer stages and generally results in fewer risks of contamination (black spots, gels) of the composition than by compounding.

The said composition can be used according to the invention to manufacture granules or powders, which can, in their turn, be used in conventional processes for the shaping of polymers for the manufacture of filaments, pipes, films, sheets and/or articles that are moulded and transparent.

A subject-matter of the present invention is in particular a process for manufacturing a transparent article, the said process comprising:

a stage of supplying semicrystalline polymer in accordance with that defined above;

a stage of mixing the said copolymer with at least one transparent amorphous PA and at least one glass filler and/or at least one PEBA and/or at least one additive, so as to manufacture a composition as defined above;

a stage of processing, in particular in a mould or a die, the copolymer or the composition at a temperature T0 within the range from 50 to 120° C., preferably from 60 to 100° C., preferably from 60 to 95° C.;

and then a stage of recovering the transparent article.

The term "processing" is understood here to mean any process for shaping polymers, such as moulding, injection moulding, extrusion, coextrusion, hot pressing, multi-injection moulding, rotational moulding, sintering, laser sintering, and the like, starting from the composition according to the invention.

For the process for the manufacture of articles, in particular moulded, injection-moulded or extruded articles, according to the invention, granules are favoured. Use is more rarely made of powders having an average diameter, as determined using a laser diffraction particle size analyser, within the range from 400 to 600 μm. According to a specific embodiment of the process of the invention, in particular by sintering, such as laser sintering, also by rotational moulding, the compositions according to the invention are preferably provided in the powder form, the particles of which have a volume-average median diameter of less than 400 μm, preferably less than 200 μm. Mention may be made, among methods for the manufacture of powders, of cryogenic grinding and microgranulation.

Another possible embodiment of the process of the present invention can additionally comprise a preliminary stage of compounding PA with dyes and/or any other additive, before the said stage of manufacture of granules or powders.

Another subject-matter of the invention is the use of a composition as defined above for the manufacture of transparent equipment, such as glasses, frames and/or lenses, ballistic glazing, a transparent sheet, a helmet, a visor, a shield, a protective suit; sports equipment; a watch glass; space equipment, in particular satellite or space shuttle equipment; aeronautical or motor vehicle equipment, such as a windshield, glazing, a porthole, a cockpit, an aircraft canopy, a window, bulletproof glazing, in particular for a car or a structure, spotlight or headlight glazing; display glazing, in particular advertising, electronic or computer glazing; a screen component; glazing for a thermal, solar or photovoltaic panel; an article for the construction, furnishing, electrical appliance or decorative industry; for the games or toys industry; for the fashion industry, such as shoe heels or jewels; for the furniture industry, such as a table, seat or armchair component; a presentation, packaging, housing, box, container or flask article or component, an article for perfumery, for the cosmetics or pharmaceutical industry; luggage; a component for protection during transport; a protective shell of a computing, electronic or telecommunications device, in particular a telephone.

The present invention also relates to any transparent article having a composition in accordance with that defined above.

EXAMPLES

The examples below illustrate the present invention without limiting the scope thereof. In the examples, unless otherwise indicated, all the percentages and parts are expressed by weight.

All the viscosities in solution are measured in m-cresol according to standard ISO 307:2007.

Transparent amorphous polyamides used:

PAam1: PA 11/B.10, comprising less than 80 mol % of a monomer B.10 (in which "10" represents sebacic acid comprising 10 carbon atoms) and more than 20 mol % of a comonomer formed by 11-aminoundecanoic acid, the molar proportion of B.10 being >0% and the molar proportion of PA 11 being <100%.

PAam2: PA 11/B.10 with a low viscosity in solution (less than 1.10), comprising more than 80 mol % of a monomer B.10 (in which "10" represents sebacic acid comprising 10 carbon atoms) and less than 20 mol % of a comonomer formed by 11-aminoundecanoic acid, the molar proportion of PA 11 being >0% and the molar proportion of B.10 being <100%.

PAam3: PA 11/B.10 with a normal viscosity in solution (greater than 1.10) comprising more than 80 mol % of a monomer B.10 (in which "10" represents sebacic acid comprising 10 carbon atoms) and less than 20 mol % of a comonomer formed by 11-aminoundecanoic acid, the molar proportion of PA 11 being >0% and the molar proportion of B.10 being <100%.

PAam4: PA 12/B.I/B.T comprising more than 60 mol % of comonomers B.I (in which "I" represents isophthalic acid) and B.T (in which "T" represents terephthalic acid) and less than 40 mol % of a comonomer formed by lactam 12, the molar proportion of PA 12 comonomers being >0% and the molar proportion of B.I and B.T being <100%.

These polyamides are prepared according to the process described in the document of Patent WO 2009153534 from page 20, line 12, to page 21, line 9.

Glass fibres used: those corresponding to Patent EP 2 169 008 and produced by Asahi Fiber Glass Company, or the S-2® glass fibres sold by AGY.

Semicrystalline polyamide used:

PAsc: PA 11 with a viscosity in solution of less than 1.30 (intrinsic viscosity measured according to Arkema method: 0.5 g/dl in meta-cresol at 25° C.).

PAsc2: PA 11 with a viscosity in solution of greater than 1.30.

PEBA used: PA 12-PTMG (with a number-average molecular weight of the PA-PE blocks: 2000-1000).

All the abovementioned PAs and PEBAs are sold by Arkema.

The transparency properties: transmittance and haze are measured on a sheet with a thickness of 2 mm. The transparency properties are tested on standardized test specimens in accordance with the standards used and shown in Table 1. The flow or fluidity properties (MVR), such as the length of flow, of the compositions are also measured in Table 3, under the same spiral flow test conditions (speed of rotation of the screw, the feed temperature of the nozzle at the injection point, and the like).

These sheets and test specimens are obtained by injection moulding starting from granules of PAam, PAsc, glass fillers and optional PEBA and additives, dry blended beforehand, with compositions specified above and as shown in Tables 2 and 3.

The percentages shown are by weight.

Tables 1 to 3 show that only Examples 1 to 10 (Ex. 1 to Ex. 10) according to the invention combine high transparency (transmittance greater than 75% and haze of less than 15%, at 560 nm on a sheet with a thickness of 2 mm, measured using a Konica-Minolta 3610d spectrophotometer, according to Standard ISO 13468-2:2006 for transmittance and according to Standard ASTM D 1003-97(A) for haze) and better fluidity (MVR greater than 10), in contrast to Comparative Examples 1 to 4 (Cp 1 to Cp 4).

TABLE 1

| Haze (ASTM D1003-97(A)) | Transmittance % (560 nm, 2 mm, ISO 13468-2: 2006) |
|---|---|

TABLE 2

| Test No. | Tm, Composition | Thickness (mm) | Haze (D1003-97)(C) | Transmittance (560 nm) |
|---|---|---|---|---|
| Cp 1 | Tm: 70° C., PAam1 - GF 15%- MB 1% | 1 | 18 | 85 |
|  |  | 2 | 19 | 83 |
|  |  | 3 | 33 | 76 |
| Ex. 1 | Tm: 70° C., PAam1 - GF AFG 15%-PAsc 10%- MB 1% | 1 | 10 | 86 |
|  |  | 2 | 8 | 85 |
|  |  | 3 | 13 | 81 |

MB corresponds to Blue Masterbatch (Renol Blue AG51425029-ZA Clariant Taiwan)

TABLE 3

| | Test No. | | | | |
|---|---|---|---|---|---|
| | Cp 2 | Ex. 2 | Ex. 3 | Cp 3 | Ex. 4 |
| PAsc | 0 | 20 | 10 | 0 | 30 |
| PAsc2 | | | | | |
| PAam1 | 84 | 54 | | | |
| PAam2 | | | 64 | 64 | 34 |
| PAam3 | | | | | |
| PAam4 | | | | | |
| PEBA | 5 | 5 | 5 | 5 | 5 |
| GF AFG | 10 | 20 | 20 | 30 | 30 |
| GF S-2 (AGY) | | | | | |
| MB | 1 | 1 | 1 | 1 | 1 |
| Total (%) | 100 | 100 | 100 | 100 | 100 |
| Tg (° C.) DSC (° C./min) | 127 | 102 | 123 | 142 | 118 |
| Transmittance | | | | | |
| Injection temperature: 60° C. | 81 | 86 | | | 88 |
| 80° C. | | 87 | 84 | | |
| 95° C. | | | 87 | 84 | |
| Haze | | | | | |
| Injection temperature: 60° C. | 45.6 | 18.4 | | | 5.1 |
| 80° C. | | 9.9 | 30.1 | | |
| 95° C. | | | 8.4 | 30.3 | |
| MVR (275° C., 2.16 kg) | | 10.2 | 15.7 | 7.7 | 18.8 |
| Refractive index (2 mm) 589 nm of the composition | | | | | |
| Refractive index of the glass fibre | | | | | |
| Difference in refractive index | | | | | |

| | Test No. | | | | | |
|---|---|---|---|---|---|---|
| | Cp 4 | Ex. 5 | Ex. 6 | Ex 7 | Ex. 8 | Ex. 9 | Ex. 10 |
| PAsc | | 20 | 10 | 30 | 10 | | 10 |
| PAsc2 | | | | | | 10 | |
| PAam1 | | | | | | | |
| PAam2 | 35 | 25 | | 20 | 28 | 28 | 26 |
| PAam3 | | | 25 | | | | |
| PAam4 | 35 | 25 | 25 | 30 | 42 | 42 | 39 |
| PEBA | | | | | | | 5 |
| GF AFG | | | | | | | |
| GF S-2 (AGY) | 30 | 30 | 30 | 20 | 20 | 20 | 20 |
| MB | | | | | | | |
| Total (%) | 100 | 100 | 100 | 100 | 100 | 100 | 100 |
| Tg (° C.) DSC (° C./min) | 143 | 108 | 109 | 93 | 134 | 135 | 128 |

TABLE 3-continued

| Transmittance | | | | | | | | |
|---|---|---|---|---|---|---|---|---|
| Injection temperature: | 60° C. | | | | | | | |
| | 80° C. | | | | | | | |
| | 95° C. | 72 | 78 | 79 | 85 | 83 | 82 | 82 |
| Haze | | | | | | | | |
| Injection temperature: | 60° C. | | | | | | | |
| | 80° C. | | | | | | | |
| | 95° C. | 62.7 | 21.8 | 24.2 | 10.9 | 34.6 | 28.1 | 21.2 |
| MVR (275° C., 2.16 kg) | | 2.3 | 5.5 | 3.6 | 6.5 | 3.3 | 3.7 | 4.5 |
| Refractive index (2 mm) 589 nm of the composition | | | 1.517 | | 1.519 | | | |
| Refractive index of the glass fibre | | | 1.523 | | 1.523 | | | |
| Difference in refractive index | | | 0.006 | | 0.004 | | | |

The invention claimed is:

1. A polyamide-based transparent composition comprising:
   from 5.0 to 30.0% by weight of semicrystalline polyamide, wherein the semicrystalline polyamide is chosen from: PA 4.10, PA 6, PA 6.6, PA 4.6, PA 6.10, PA 6.12, PA 11, PA 12, PA 9.10, PA 9.12, PA 9.13, PA 9.14, PA 9.15, PA 9.16, PA 9.18, PA 9.36, PA 10.10, PA 10.12, PA 10.13, PA 10.14, PA 12.10, PA 12.12, PA 12.13, PA 12.14, PA 6.14, PA 6.13, PA 6.15, PA 6.16, PA 6.18, and mixtures thereof;
   from 20.0 to 80.0% by weight of at least one amorphous, transparent and at least partially cycloaliphatic polyamide;
   from 5.0 to 40.0% by weight of glass filler;
   and optionally:
   from 0.0 to 5.0% by weight of at least one copolymer comprising polyether blocks and polyamide blocks;
   from 0.0 to 5.0% by weight of additives,
   with respect to the total weight of the composition,
   wherein the polyamide composition has a transmittance of 85% or more and a haze of less than 15% when the composition is molded into a sheet having a thickness of 2 mm.

2. The composition according to claim 1, wherein the glass filler comprises, expressed as % by weight, with respect to the total weight of filler, 60.0 to 65.5% of silicon dioxide ($SiO_2$), 23.0 to 25.0% of aluminium oxide ($Al_2O_3$), 0.0 to 5.0% of boron oxide ($B_2O_3$), 0.0 to 9.0% of calcium oxide (CaO), 0.0 to 5.0% of zinc oxide (ZnO), 0.0 to 1.0% of zirconium oxide ($Zr_2O_3$), 0.0 to 5.0% of strontium oxide (SrO), 0.0 to 1.0% of barium oxide (BaO), 6.0 to 11.0 % of magnesium oxide (MgO), 0.0 to 5.0% of lithium oxide ($Li_2O$), 0.0 to 0.1% of sodium oxide ($Na_2O$), 0.0 to 10.0% of potassium oxide ($K_2O$) and 0.0 to 0.1% of iron oxide ($Fe_2O_3$).

3. The composition according to claim 1, wherein the glass filler comprises, in % by weight with respect to the total weight of filler, 68.0 to 74.0% of silicon dioxide ($SiO_2$), 2.0 to 5.0% of aluminium oxide ($Al_2O_3$), 2.0 to 5.0% of boron oxide ($B_2O_3$), 2.0 to 10.0% of calcium oxide (CaO), 0.0 to 5.0% of zinc oxide (ZnO), 0.0 to 5.0% of strontium oxide (SrO), 0.0 to 1.0% of barium oxide (BaO), 1.0 to 5.0% of magnesium oxide (MgO), 0.0 to 5.0% of lithium oxide ($Li_2O$), 5.0 to 12.0% of sodium oxide ($Na_2O$) and 0.0 to 10.0% of potassium oxide ($K_2O$), wherein the total amount of lithium oxide ($Li_2O$), sodium oxide ($Na_2O$) and potassium oxide ($K_2O$) is from 8.0 to 12.0%.

4. The composition according to claim 1, wherein the differences in the refractive indices between the glass filler and the resin component of the composition is 0.006 or less with respect to light having a wavelength of 589 nm; 0.006 or less with respect to light having a wavelength of 486 nm; and 0.006 or less with regard to light having a wavelength of 656 nm.

5. The composition according to claim 1, wherein the glass filler has a total content of silicon dioxide ($SiO_2$) and aluminium oxide ($Al_2O_3$) from 83.0 to 90.5% by weight of the glass filler.

6. The composition to claim 1, wherein the glass filler has a total content of silicon dioxide ($SiO_2$) from 60.0 to 65.5% by weight of the glass filler.

7. The composition according to claim 1, wherein the glass filler has a content of $Na_2O$ of 0.0 to 0.1% with respect to the total weight of the glass filler.

8. The composition according to claim 1, wherein the glass filler has a content of $Al_2O_3$ from 23.0 to 25.0% with respect to the total weight of the glass filler.

9. The composition according to claim 1, wherein the glass filler has a content of CaO from 0.0 to 9.0% with respect to the total weight of the glass filler.

10. The composition according to claim 1, wherein the glass filler has a content of MgO from 6.0 to 11.0% with respect to the total weight of the glass filler.

11. The composition according to claim 1, wherein the glass filler has a content of $B_2O_3$ from 0.0 to 5.0% with respect to the total weight of the glass filler.

12. The composition according to claim 1, wherein the glass filler has a total content of lithium oxide ($Li_2O$), sodium oxide ($Na_2O$) and potassium oxide ($K_2O$) from 0.0 to 0.1%, with respect to the total weight of the glass filler.

13. The composition according to claim 1, wherein the glass filler has a total content of silicon dioxide ($SiO_2$) and aluminium oxide ($Al_2O_3$) from 71.0 to 76.0% by weight of the glass filler.

14. The composition according to claim 1, wherein the glass filler has a content of silicon dioxide ($SiO_2$) from 68.0 to 72.0%, with respect to the total weight of the glass filler.

15. The composition according to claim 1, wherein the glass filler has a content of $Na_2O$ from 8.0 to 11.0%, with respect to the total weight of the glass filler.

16. The composition according to claim 1, wherein the glass filler has a content of $Al_2O_3$ from 2.0 to 4.0%, with respect to the total weight of the glass filler.

17. The composition according to claim 1, wherein the glass filler has a content of CaO from 6.0 to 9.0%, with respect to the total weight of the glass filler.

18. The composition according to claim 1, wherein the glass filler has a content of MgO from 1.0 to 3.0%, with respect to the total weight of the glass filler.

19. The composition according to claim 1, wherein the glass filler has a content of $B_2O_3$ from 2.0 to 4.0%, with respect to the total weight of the glass filler.

20. The composition according to claim 1, wherein the glass filler has a total content of calcium oxide (CaO), zinc oxide (ZnO), strontium oxide (SrO) and barium oxide (BaO) from 4.0 to 10.0%, with respect to the total weight of the glass filler.

21. The composition according to claim 1, wherein the glass filler has a total content of lithium oxide ($Li_2O$), sodium oxide ($Na_2O$) and potassium oxide ($K_2O$) from 8.0 to 11.0%, with respect to the total weight of the glass filler.

22. The composition according to claim 1, wherein the glass filler is free of titanium oxide ($TiO_2$).

23. The composition according to claim 1, comprising 5.0 to 30.0% by weight of glass filler with respect to the total weight of the composition.

24. The composition according to claim 1, wherein the glass filler is chosen from the group consisting of glass fibres, glass powder, glass flakes, milled fibres, glass beads and mixtures thereof.

25. The composition according to claim 1, wherein the additive is chosen from: colouring agents; UV stabilizers; anti-ageing agents; antioxidants; fluidizing agents; anti-abrasion agents; mould-release agents; stabilizers; plasticizers; impact modifiers; surfactants; brighteners; fillers; fibres; waxes; and mixtures thereof.

26. Granules or powder formed from a composition of claim 1.

27. A method of using the granules of claim 26 for the manufacture of filaments, pipes, films sheets and/or articles that are moulded and transparent.

28. A polyamide-based product, wherein the product is manufactured by moulding, injection moulding, extrusion, coextrusion, hot pressing, multi-injection moulding, rotational moulding, or sintering, of a polyamide composition according to claim 1.

29. A process for manufacturing a transparent article reinforced with glass fillers, the process comprising:
a stage of supplying a semicrystalline polyamide;
a stage of mixing the semicrystalline polyamide with at least one transparent amorphous PA and at least one glass filler and optionally at least one copolymer comprising polyether blocks and polyamide blocks and/or at least one additive, so as to manufacture a composition according to claim 1;
a stage of processing the composition at a temperature T0 within the range from 50 to 120° C.;
and then a stage of recovering the transparent article.

30. The process according to claim 29, wherein the article is one of the following: transparent equipment; sports equipment; a watch glass; space equipment; aeronautical or motor vehicle equipment; display glazing; screen component; glazing for a thermal, solar or photovoltaic panel; an article for the construction, furnishing, electrical appliance or decorative industry; article for the games or toys industry; article for the fashion industry; article for the furniture industry; a presentation, packaging, housing, box, container or flask article or component, an article for perfumery, article for the cosmetics or pharmaceutical industry; luggage; a component for protection during transport; a protective shell of a computing, electronic or telecommunications device.

31. The composition according to claim 1, wherein the at least partially cycloaliphatic polyamide comprises more than 50 mol % of an equimolar combination of at least one cycloaliphatic diamine and of at least one aliphatic dicarboxylic acid.

* * * * *